United States Patent [19] — Lorig et al.

[11] 4,424,572

[45] Jan. 3, 1984

[54] DEVICE FOR THE DIGITAL TRANSMISSION AND DISPLAY OF GRAPHICS AND/OR OF CHARACTERS ON A SCREEN

[75] Inventors: Bernard Lorig, 18 rue de Brest, 35000 Rennes, France; Jean-Claude Rahuel; Catherine Roux, both of Rennes, France

[73] Assignees: Etablissement Public de Diffusion dit Telediffusion de France, Montrouge; Bernard Lorig, Rennes, both of France

[21] Appl. No.: 185,572

[22] Filed: Sep. 9, 1980

[30] Foreign Application Priority Data

Sep. 12, 1979 [FR] France ............ 79 22780

[51] Int. Cl.³ ............ G06F 3/14

[52] U.S. Cl. ............ 364/900; 340/703; 340/747; 340/798

[58] Field of Search ... 364/200 MS File, 900 MS File, 364/515, 521; 340/703, 717, 723, 747, 798, 801

[56] References Cited

U.S. PATENT DOCUMENTS

| | | | |
|---|---|---|---|
| 3,534,338 | 10/1970 | Christensen | 364/200 |
| 3,925,776 | 12/1975 | Swallow | 340/703 |
| 4,016,544 | 4/1977 | Morita | 364/900 |
| 4,070,710 | 1/1978 | Sukonick | 364/900 |
| 4,094,000 | 6/1978 | Brudevold | 364/900 |
| 4,103,331 | 7/1978 | thacker | 364/200 |
| 4,303,986 | 12/1981 | Lans | 364/900 |

FOREIGN PATENT DOCUMENTS 2338531 8/1977 France .

*Primary Examiner*—Gareth D. Shaw
*Assistant Examiner*—Daniel K. Dorsey

[57] ABSTRACT

The present invention relates to a device for the digital transmission and display of graphics and/or of characters on a screen, the device comprising a terminal connected to a transmission network, to a graphic acquisition device and to a unit for display on a screen. Each terminal comprises a storage unit which, according to the invention, comprises a plurality of storage assemblies validatable in parallel, each storage assembly comprising a circuit effecting a logic combination between an input word and the word already written at the address indicated. The invention is more particularly applicable to the production of telewriting systems or of combined systems of telewriting and videotext (viewdata).

9 Claims, 7 Drawing Figures

FIG.3
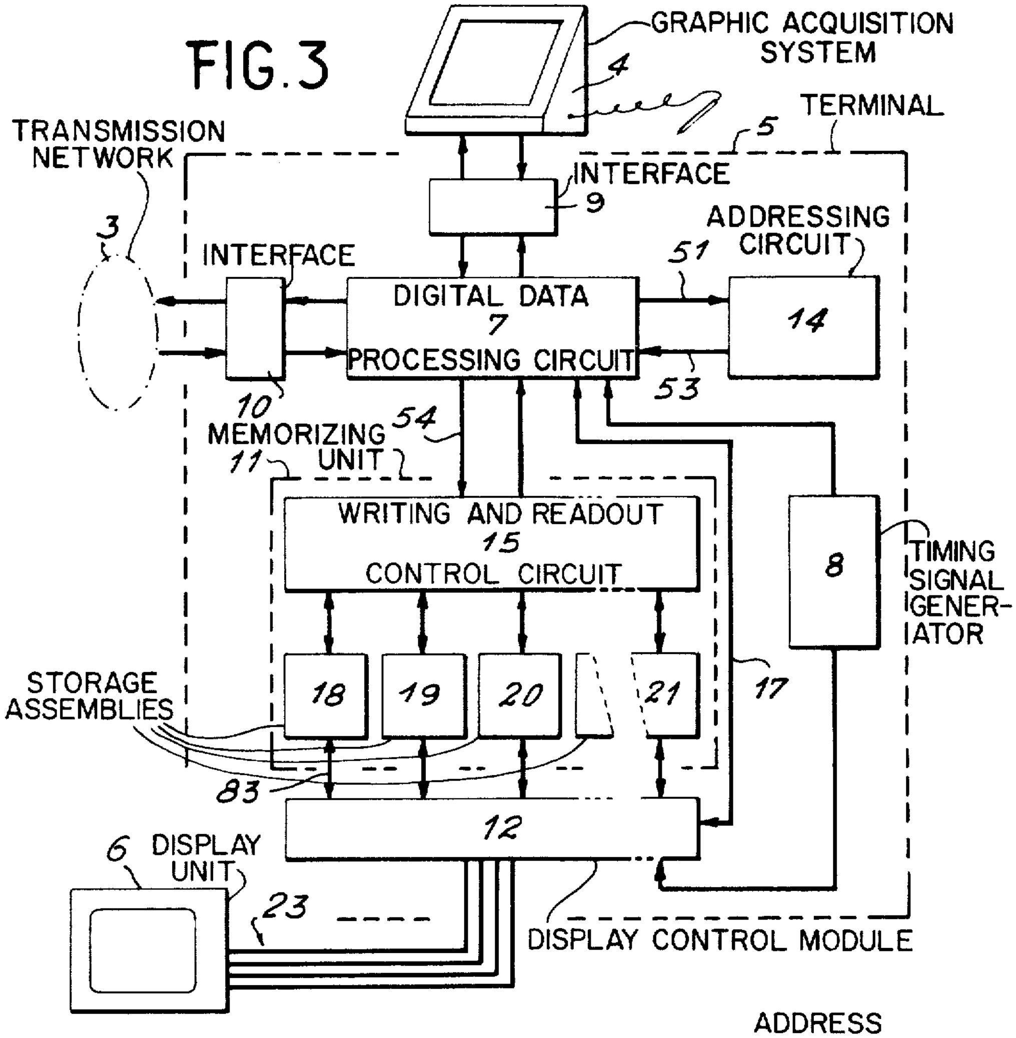
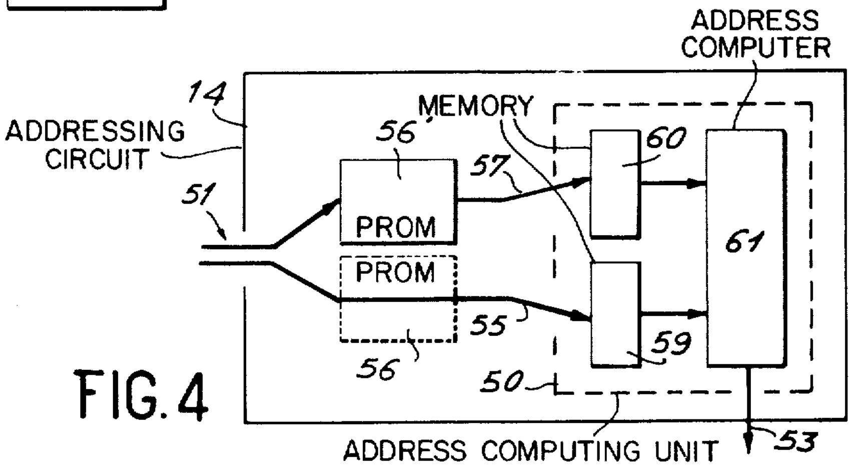
FIG.4

DEVICE FOR THE DIGITAL TRANSMISSION AND DISPLAY OF GRAPHICS AND/OR OF CHARACTERS ON A SCREEN

BACKGROUND OF THE INVENTION

1. Field of the Invention

The present invention relates to a device for the digital transmission and display of graphics and/or of characters on a screen. It finds application in the transmission and display on display devices, such as television receivers, of writing, drawings, characters, etc. . . . for purposes of discussion aid, information, identification, authentification, teaching or entertainment. This is a system for exchanging or receiving information through any transmission network, of the interactive or broadcast type.

The importance and interest of telewriting devices are continually increasing. It will be recalled that these devices comprise, at the end of a transmission line or channel, graphic acquisition units which may be in various forms (writing boards, displays, light pens, rolling balls, etc. . . . ) adapted periodically to deliver the coordinates of the points constituting the graphics plotted, these coordinates then being coded then, transmitted on the transmission line or channel, and, at the other end, means for decoding the signals received and units for displaying the decoded signals, of the cathode ray tube, plasma panels, plotting boards, special printing machine, etc. . . . type, these units restoring the graphics plotted on the acquisition means.

2. Description of the Prior Art

Such systems have already been described, particularly in the following documents:

the text of the conference at the Müncher Kreis by Jean-Paul Dagnelie (June 1978) entitled "Teleboard Systems";

the text of the conference by Jean-Paul Dagnelie (June 1979, Paris) at the IFIP 79 Teleinformatics Congress, entitled "Telewriting";

French Patent Application No. 77 39395, filed on Dec. 21, 1977 (Patent Publication No. 2,412,997) and entitled "Writing board, particularly for telewriting system";

French Patent Application No. 77 29413, filed Sept. 26, 1977 (Patent Publication No. 2,404,351) and entitled "Bidirectional telewriting system with automatic alternating functioning on one carrier wave".

As these systems are already widely known, their structure will not be described in detail; the essential principles thereof will simply be recalled with a view to facilitating understanding of the invention. Reference may be made to the above-mentioned documents, which must be considered as being incorporated in the present specification, for details of design or production.

FIG. 1 of the accompanying drawings very schematically shows the elements of a telewriting system. Such a system comprises telewriting assemblies 2, 2', 2", etc. . . . which exchange information through a transmission network 3. Each assembly comprises a graphic acquisition system 4 (such as for example a writing board or display for writing, scratching, erasing, etc. . . . ), a terminal 5 which acquires the information coming from the board, gives it a format adapted for transmission on the network 3 and stores it, and, finally, a display unit 6. The terminal also processes the information coming from assemblies 2' and 2" through the network 3, stores it and ensures display thereof on the unit 6, at the same time as that coming from system 4.

The transmission network 3 of FIG. 1 contains the adequate modulation and demodulation equipment. This network may be of the point to point type: two-wire telephone line (rented or switched), four-wire telephone line, telegraphic line, TRANSPAC network, CADUCEE network, TRANSMIC network, . . . or of broadcast type: television (with or without use of the DIDON system), radio with frequency modulation or amplitude modulation, etc. This list of transmission networks or channels is given only by way of indication and is in no way limiting.

To give an idea of size, a network having an output of at least 200 bits/s is presently required for transmitting writing without delay. Nevertheless, a more elaborate coding of the in-line emitted information may be used to reduce this output. In the case of a transmission channel or network having lower outputs, the writing is transmitted with a delay which depends on the quantity of data to be transmitted and on the transmission capacity of the channel or network.

The general organization of a telewriting assembly is described in greater detail in FIG. 2 of the accompanying drawings. Such an assembly comprises a terminal 5 associated with a graphic acquisition device 4 and with a unit 6 for display on a screen. The terminal 5 is organized around a digital data processing circuit 7 connected to the graphic acquisition device 4 via an interface 9 and to the network 3 via an interface 10. The circuit 7 receives from one or the other of these interfaces digital data comprising in particular the coordinates X and Y of the points composing the graphic and display codes (color, eraser, incrustation, etc. . . . ) or information enabling them to be reconstituted. Each terminal further comprises a unit 11 for memorizing these digital data inserted between the data processing system 7 and a display control module 12, the latter controlling the display of the corresponding points by the display unit 6.

When the data come from the network 3, the circuit 7 decodes the information that it receives, in order to reconstitute all the points of the curve of the graphic or the writing. These points are then stored in the image store 11 in which each point to be displayed is represented by a memory element in black and white display systems and by two memory elements in two-color display systems. In the case of the information coming from board 4 through the interface 9, the processing circuit 7 reconstitutes the points of the curve of the graphic or the writing, and stores them in the store 11 as indicated previously. Moreover, the processing circuit 7 elaborates the codes to be sent to the correspondent through the interface 10 and the transmission network 3.

The image store furnishes the display control module 12 with information from which the latter elaborates video signals in basic channel intended for the display unit 6, of the general public color television type, for example.

A timing signal generator 8 times the different units of the terminal and in particular the processing system 7 and the display control module 12. In particular, the times of access to the image store 11 are shared, due to the timing signals, between the processing system 7 and the module 12 in order to avoid conflicts of access.

Having recalled the telewriting systems, it is now possible to deal with the problems which the present invention proposes to solve.

Present telewriting systems display the graphics in white on a black background, or in two colors (for example red or green) on a black background, and the user can only choose between two colors to write. Moreover, he cannot keep track of his drawings after the screen has been scratched, since no temporary or definitive storage is possible: the life duration of a drawing does not exceed that of its display. These two limits bring about the following difficulties in use.

The limitation to two display colors is particularly undesirable in the telewriting systems as it limits the applications thereof. In fact, in certain cases, a large amount of information must be exchanged and the color constitutes additional data which is particularly convenient to use since it accompanies the drawing itself. Teaching may for example be mentioned in this respect. The possibility of writing with more than two colors is thus an essential need felt by many users.

However, present telewriting systems have limited performances which precisely prevent the display in more than two colors. Moreover, the limitation in performance renders display of the writing difficult. Thus, for example, the fact of going over an already existing line with another color merely gives the combination of the points of the two colors. The additional information that a line has been plotted after another is lost.

In the present telewriting systems, access to the information by the user is limited in time to the duration in which it is present on the display unit. This constitutes a serious drawback since it is not possible to record information exchanged in the course of discussion or communication. For example, the speakers cannot return to a drawing or graphic having already formed the subject matter of a discussion, but which has been scratched, without having to redo it entirely, at one or the other of the ends. Similarly, the users cannot prepare drawings for subsequent use in the course of a discussion or statement.

In summary, the earlier telewriting systems are limited, both concerning the information exchanged by the speakers and that which the speakers have temporarily or permanently stored.

It is an object of the present invention to remedy these drawbacks and therefore to increase the capacity of information offered to the users.

SUMMARY OF THE INVENTION

To this end, the terminal of the invention comprises a plurality of storage assemblies constituted by RAMS whose capacity is sufficient for each to contain all the information corresponding to a complete image covering the screen, these storage assemblies all being validated in parallel, simultaneous access to a plurality of storage assemblies being possible.

Three assemblies may be used for example for storing the images, each point to be displayed on the screen being associated with a point of each of the three assemblies, each assembly being appropriated for the storage of one of the primary colors red, blue or green. Each point may be "lit", or not, in each of the three primary colors, and therefore in all combinations thereof. Still by way of example, a fourth storage assembly may be used for storing the different drawings or graphics as they are elaborated. The storage of these drawings is conserved after complete scratching of the screen and this recording remains available for all the subsequent conversation. Similarly, a fifth assembly may be used for obtaining a flashing of the points, etc. These examples are given by way of indication for understanding the invention, but they do not restrict in any way the generality of the invention and its applications, other uses of the storage assemblies being able to be adopted according to the applications envisaged.

The fact of being able to have access in parallel to the various storage assemblies of the invention makes it possible to write in a plurality or in all the assemblies at once. For example, to write in yellow, one will write in the assemblies corresponding to the colors red and green; similarly, to obtain white lines, one will write in the three assemblies red, green and blue. This feature of accessibility in parallel increases the overall performances of the system. In fact, writing in white requires only one cycle of writing in storage simultaneously in the three red, green and blue assemblies instead of three successive cycles of writing in three assemblies taken one by one.

According to a further feature of the invention, each storage is associated with a logic function generator controlled by appropriate codes and adapted to combine the words to be written with words already written in the store. This combination is effected during the cycle of writing of the storage assemblies. Thus, any logic combination on writing between two words is possible to perform complex functions, in two cycle times only, and one request for access to the storage, this considerably improving the overall performances of the system. To this end, mention may be made of the plotting of a line intersecting another line of different color. At the point of intersection, the color of the last line plotted will be observed, without modification of the adjacent points. Thus, the temporal information between the two outlines will be conserved by resorting to the incrustation of one or a plurality of points of one color between other points of different color. This operation requires the combination of the word already written in the storage assemblies and containing the written point with the word to be written containing this same point, this being effected by the circuit of the invention.

Finally, it may be added that, to be efficient, the present telewriting systems must have display units which are identical or at least of the same visual definition. Now, this is not the case, for example, when television receivers of European standards (625 lines) and receivers of North American standards (which only comprise 525 lines) are used. In this case, an image inscribed on a European type receiver will give a deformed image on an American type receiver. This drawback is met with each time the display device is changed. The present invention also remedies this drawback by enabling the image supplied to be adapted to the display device used.

BRIEF DESCRIPTION OF THE DRAWING

The invention will be more readily understood on reading the following description with reference to the accompanying drawings, in which:

FIG. 3 shows the block diagram of a telewriting terminal according to the invention;

FIG. 4 shows the block diagram of a system for computing an address which is stored from modified coordinates of a point;

DESCRIPTION OF PREFERRED EMBODIMENTS

Figure 1:
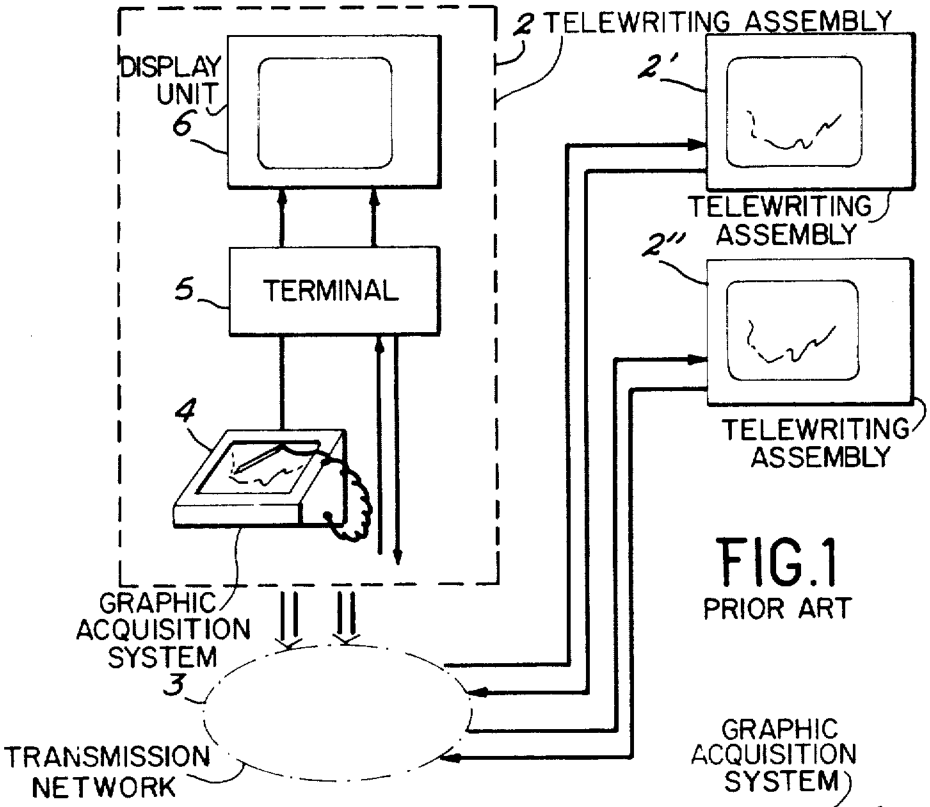
FIG. 1 PRIOR ART
FIG. 1, which has already been described, shows the block diagram of a telewriting system according to the prior art.
Figure 2:
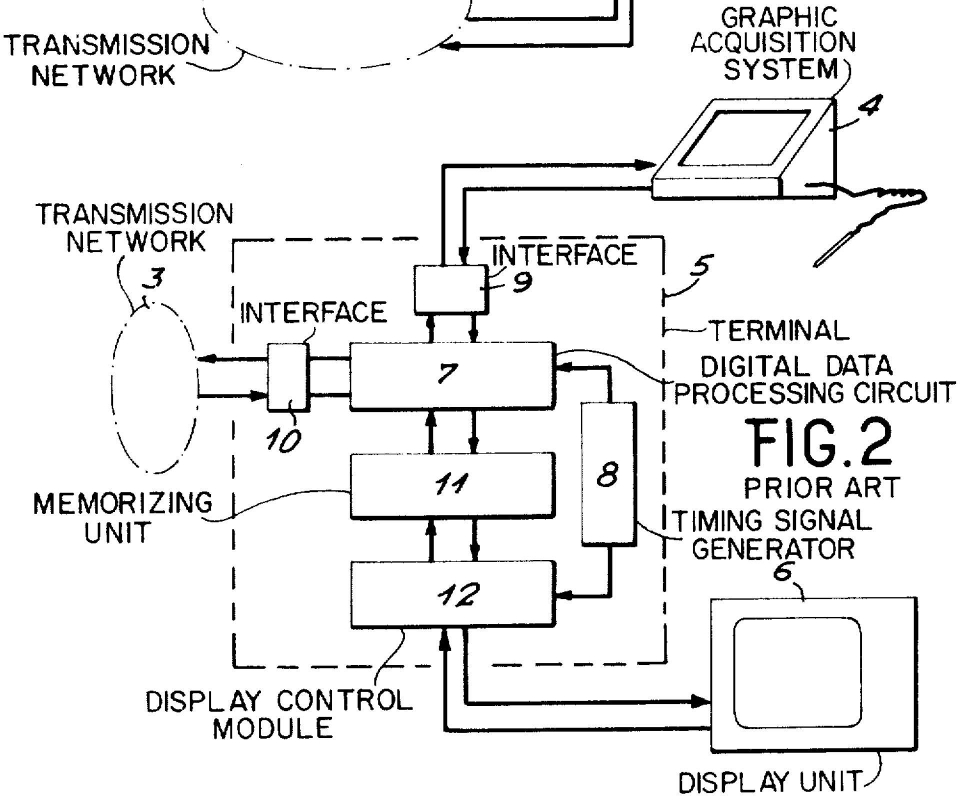
FIG. 2 PRIOR ART
FIG. 2, which has already been described, shows the block diagram of a telewriting terminal according to the prior art.

Referring again to the drawings, the device shown in FIG. 3 comprises, in addition to the means already shown in FIG. 2 and which, for simplification, bear the same references:

(a) a plurality of storage assemblies 18,19,20,21,etc. . . . which are identical and comprise the same number of binary storage elements; each storage assembly is constituted by a random access memory (RAM) of sufficient capacity to be able to contain all the information corresponding to a complete image covering the screen;

(b) a circuit 14 for computing the addresses of the elements to be written in the storage assemblies; this circuit receives, via the data processing circuit 7 and for each current point written on the graphic acquisition device 4, the coordinates X and Y of this point and it delivers a binary word $P_i$ comprising one binary element at "1" and a digital signal constituting an address for storage of this word $P_i$;

(c) a writing and read-out control circuit 15 in the storage assemblies.

Such a device functions substantially like the prior known devices. The information to be displayed by the unit 6 comes from the telewriting terminal 5 which takes it either from another terminal connected to the preceding one by the transmission network 3, or from the graphic acquisition device 4. In the latter case, the information is also sent to the other terminals of the system.

The information acquired by the terminal 5 is converted by the circuit 7 and furnished, with the appropriate control codes, to the writing and read-out control circuit 15. If necessary, the circuit 7 processes the information to send it through the transmission network 3. The writing/read-out assembly 15 directs the information in storage, according to the controls furnished by the circuit 7, in the different storage assemblies 18,19,20,21 . . . . The display control module 12 reads the information in storage and directs a composite video television signal: red, green, blue, in basic channel, towards the display unit via the conductors 23.

The timing generator 8 furnishes the various timing signals necessary for the circuit 7 and for the display control module 12. Information on sequencing conveyed via a lead 17 intervenes in the circuit 7 and in the display module 12 to manage the accesses to the storage assemblies 18, 19, 20, 21, . . . so as to avoid the conflicts which might arise and the switching parasites on the display device 6.

The different means for computing address, for writing-read-out and for storage which form part of the invention will now be described in greater detail, the other circuits being of any known type.

The addressing circuit 14, firstly, is shown in FIG. 4. It comprises an address computing unit 50 which receives the coordinates X and Y of the point to be displayed, or, if the standards of the display unit 6 are different from those of the acquisition device 4, the coordinates X' and Y' of said point counted in accordance with the standards of the display unit. In this case, the circuit 14 comprises programmable read-only memories (PROMs) 56 and 56' respectively receiving the coordinates X and Y and delivering the converted coordinates X' and Y'. The figure corresponds to the particular case of the display device being a 525 line television in accordance with North American standards. In this case, only the coordinate Y, corresponding to the line number, is to be converted. From the coordinates (X, Y) furnished by the connection 51, the coordinate Y is furnished to the programmable memory 56' which delivers via connection 57 the modified coordinate Y'. To this end, the memory 56' is filled so that the coordinates Y and Y' correspond. The coordinate X, for its part, remains unchanged and is furnished directly by the connection 55 to the address computing unit 50, the memory 56 which is shown in dotted lines then being absent.

The address computing unit 50 comprises two memories 59 and 60 respectively receiving the coordinates X' and Y' and an address computer 61.

To describe the functioning of this circuit and purely by way of explanation, it will be assumed that the display unit is a television receiver using 512 lines on each of which 768 points are sampled, each line being broken down into 96 groups of 8 points. Three binary elements or bits are therefore necessary to locate a point in a group and 7 bits for locating the group in the line, or a total of 10 bits for defining the address X'. The address Y' specifies the row of the line out of 512 and therefore comprises 9 bits. All the 19 bits are addressed to the address computer 61. The latter causes the memories 59 and 60 to play the role of shift register and delivers an address comprising 3 bits of low weight specifying the place of a bit at "1" in an octet $P_i$ and 16 bits of high weight, or 2 octets, constituting the address at which the octet $P_i$ must be stored in the different storage assemblies. Each of these assemblies must be able to store the equivalent of 512 lines of 96 octets, this corresponding to a capacity of 48K octets (K=1024).

In summary, the circuit 50 delivers, on an output connection 53, an octet $P_i$ comprising a binary element 1 at a determined site, and an address for this octet, constituted by two other octets.

Figure 5:
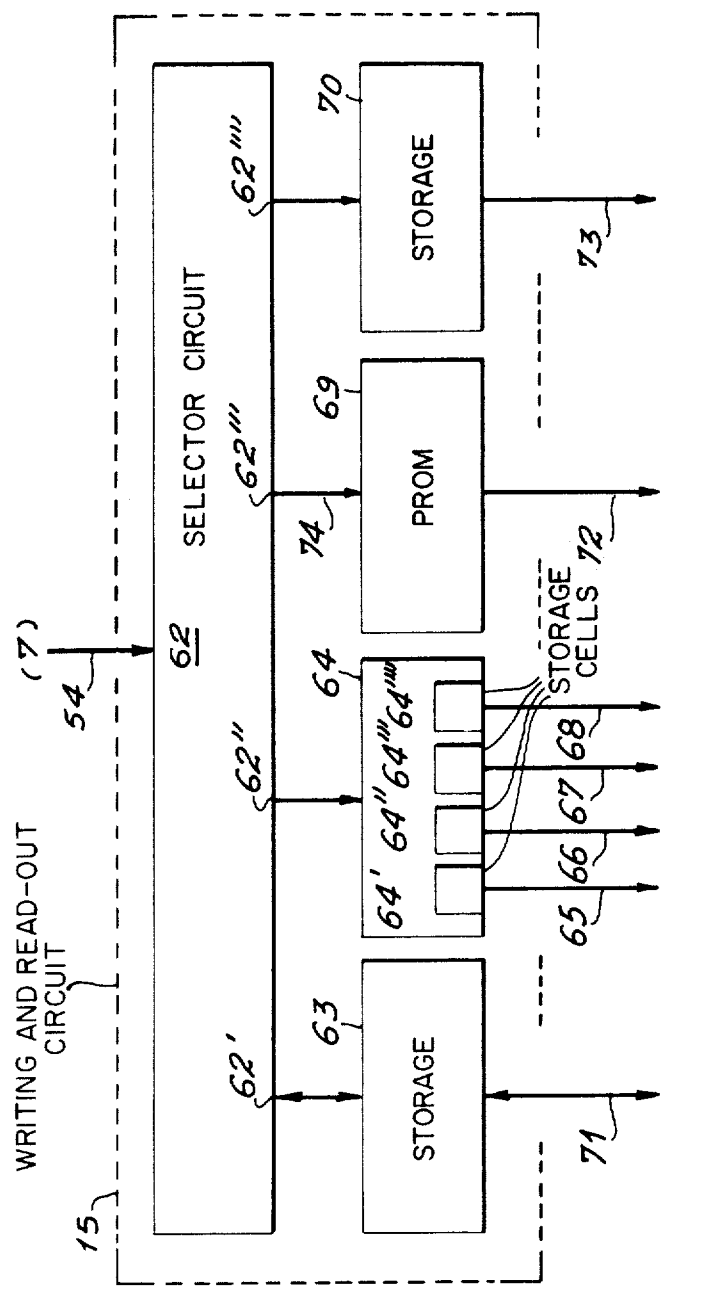
FIG. 5 shows the diagram of a writing/read-out circuit in storage.

The writing/read-out circuit 15 in the different storage assemblies is shown in FIG. 5. It comprises:

a selector circuit 62 with an input connected to the output of the circuit 7 via a connection 54, which conveys four signals: a first signal which is an octet $O_i$ which may for example be octet $P_i$ when it is simply question of writing, produced by the circuit 14, a second signal which is a validation code formed by as many binary elements as there are storage assemblies, a third signal which is a logic function code and a fourth signal which is the address of the octet $O_i$ formed by two octets. The selector 62 possesses four outputs 62', 62'', 62''' and 62'''' and it is capable of directing the four signals that it receives respectively on these four outputs;

a store 63 having an input connected to the first of these outputs 62' from which it receives the octet $O_i$, and an output connected to a connection 71;

a store 64 having an input connected to the second output 62'', from which it receives the binary elements forming the validation code; this store contains as many binary storage cells 64', 64'', 64''' . . . as there are storage assemblies, these cells each possessing an output connection, respectively 65, 66, 67, 68, etc. . . . ; these connections are connected to the validation inputs of each of said storage assemblies, as will be seen hereinafter, which may therefore all be validated in parallel;

a store 70 having an input connected to the fourth output 62'''' from which it receives the two address octets of the octet $O_i$ and with an output connection 73.

The assembly 15 may further comprise a programmable read-only memory (PROM) 69 for code conversion, with an input connected to the third output 62''' of the selector circuit 62 from which it receives a logic function code, and with an output 72 delivering a code adapted to the logic function generator. However, this memory may also be housed in this generator.

Figure 6:
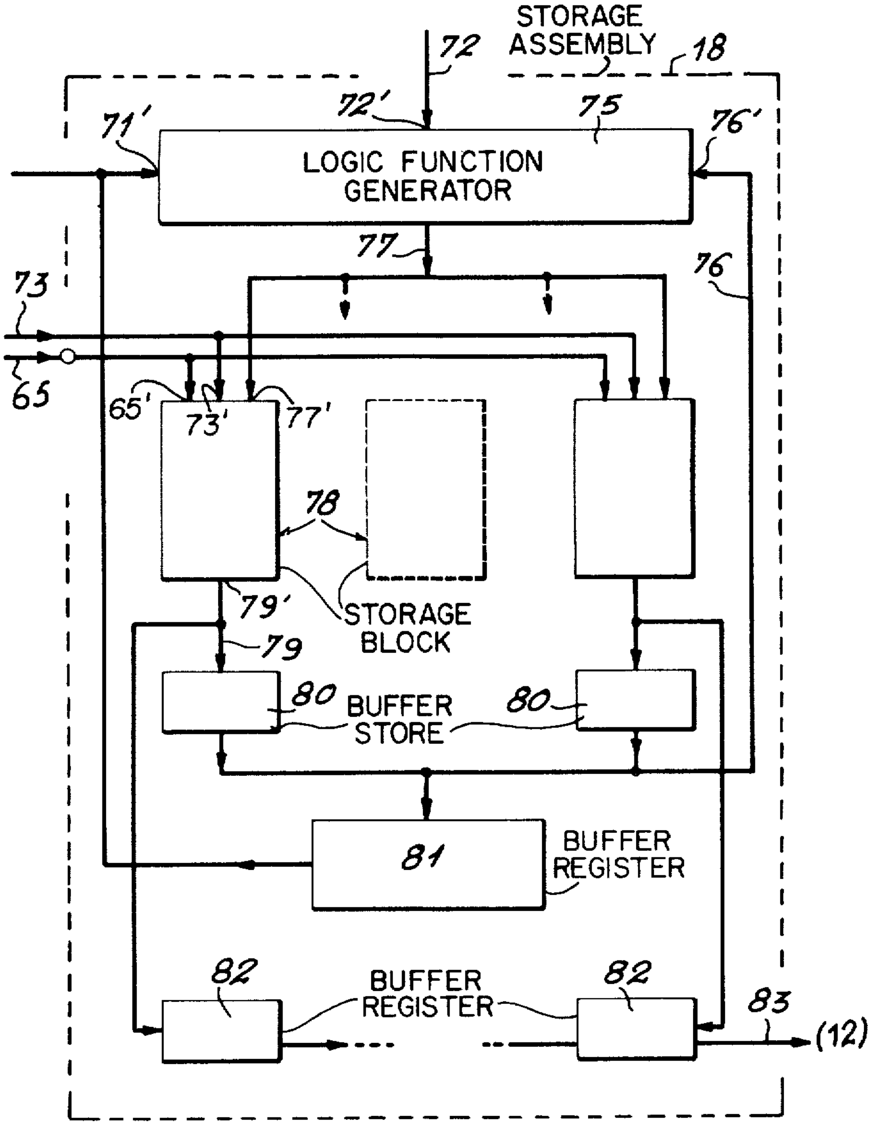
FIG. 6 shows the diagram of a storage assembly.

The organization of a storage assembly is illustrated in FIG. 6. This store is constituted by storage blocks 78 associated with buffer stores 80. Each block possesses a writing input 77', a read-out output 79', a validation input 65' and finally an addressing input 73'. The input 65' is connected to the connection 65 coming from the validation store 64, the input 77' to a connection 77, the output 79' to a connection 79 connected to the buffer store 80, and the addressing input 73' to the connection 73 issuing from the address store 70.

Each storage assembly further comprises a logic function generator 75 having a control input 72' connected to the connection 72 issuing from the store 69, a first signal input 71' connected to the connection 71 issuing from the octet store 63, a second signal input 76' connected to a connection 76 connected to the buffer store 80 and a signal output connected by a connection 77 to the writing input 77' of the store.

This store functions as follows:

The input octet $O_i$ is conveyed from the store 63 to the logic function generator 75 via the connection 71 while the address of this octet comes to the store via the connection 73 from the store 70. Let $M_i$ be the octet which already figures in the store at this address. This octet is transmitted to the generator 75 via the connection 76, which then has the two octets $O_i$ and $M_i$ to combine. The combination that it effects is determined by a function code elaborated in the data processing circuit 7 from the indications furnished by the operator. This code, after having possibly been converted in a circuit 69, is furnished to the generator via the connection 72. The octet resulting from the combination of $O_i$ and $M_i$ is then conveyed via the connection 78 towards the input 77' of the stores and it is this octet which is written. Writing will be effective in the storage assemblies which will have been validated by application of a validation signal on the connections 65, 66, 67, etc.

The store is completed by a buffer register 81 and by buffer registers 82 which are connected to the outputs of the blocks 78 and form a shift register. The output connection 83 is directed towards the display control module 12.

The logic combination process between the octets $O_i$ and $M_i$ will now be specified. The function to be produced is defined by a binary code with 5 bits: the heavy weight element determines the two cycle times which are necessary for producing the various functions of scratching, writing by crushing, writing by incrustation, slider, etc. The first time corresponds to bit "O" and the second to bit "1". The remaining bits define the logic function to be performed.

Let, for example, a point be written by incrustation in the storage assembly allocated to blue. In a first operation, this point is scratched in the three assemblies allocated to the three colors. To this end, an octet $\overline{O_i}$ complementary of $O_i$ is formed and $\overline{O_i}$ is combined with $M_i$ by a logic AND operation, this furnishing a new octet of which all the elements are zero. This first operation $\overline{O_i}.M_i \rightarrow M_i$ where the dot represents the logic AND operation is noted. The code of this AND function may be noted, for example, 0001 and, as it is a question of the first time of the cycle, a high weight binary element "O" is associated therewith, this finally giving the code 00001. The selector 62 then delivers this function code 00001 to the store 69 via the connection 74, and the validation codes of the three color assemblies to store 64.

In a second operation, the point in question must be written in the storage assembly allocated to blue. The store 64 then validates only this assembly; the function code passes to 10001, the high weight bit "1" indicating that it is a question of the second time of the cycle; for this second time, the code 0001 corresponds to a logic OR operation between the octets $O_i$ and $M_i$, operation noted $O_i + M_i \rightarrow M_i$, the sign + indicating, according to custom, operation OR. This leads to the writing by incrustation of the point in the blue storage assembly.

The Table brings together the codes corresponding to four functions, namely:

(a) incrustation with re-writing in an assembly (b) incrustation of black in assemblies without re-writing (eraser)

(c) incrustation with reversal of the colors (d) writing by octet with crushing.

The table is divided into two parts: the top part corresponding to the first time of the cycle (higher weight binary element "0") and the bottom part to the second time of the cycle (binary element "1"). In each part, the four operations (a), (b), (c) and (d) mentioed above are shown with the logic operations effected. The conventions on the logic operations have already been indicated, the sign ⊕ corresponding to the exclusive OR operation. Certain codes are not used and are free for functions other than those indicated.

In addition to the advantages already emphasized as presented by the invention, a further one is achieved thereby in connection with the transmission of information according to a videotext (view data) mode. This aspect of the invention will now be dealt with.

The so-called "ANTIOPE" system (Acquisition numérique et Télévisualisation d'Image organisées en Pages d'Ecriture) and the so-called TITAN system (Terminal Interactif de Télétexte à l'appel par Numérotation) are known. The first is essentially a broadcast (therefore unidirectional) videotext system enabling alphanumerical information organized in pages and magazines to be inserted on television channels. The second is an interactive (therefore bidirectional) videotext system compatible with the ANTIOPE system and allowing access to data bases (general information, directories, etc. . . . ) and to interactive services (transactions, messages, teaching) by the telephone network.

Numerous articles or Patent applications have already described these systems, for example:

The article by Y. Guinet entitled "Comparative study of teletext systems in broadcasting. Some advantages of the diffusion of data by packages applied to teletext", appearing in the journal of the U.E.R., Cahier Technique, No. 165, October 1977, pages 242 to 253;

The article by B. Marti and M. Mauduit entitled "ANTIOPE, teletext service", appearing in the journal "RADIO-DIFFUSION TELEVISION", 9th year, No. 40, November-December 1975, pages 18 to 23;

The specification of the "ANTIOPE" teletext system, edited by the Centre Commun d'Etudes de télévision et télécommunications (C.C.E.T.T.);

French standard of, interactive videotext, edited by the Direction Générale des Télécommunications (D.G.T.);

French Patent Application No. 76 27212, filed on Sept. 6, 1976 (Patent Publication No. 26 36 949) and entitled "System for digital transmission and for display of text on a television screen";

French Patent Application No. 76 29034, filed on Sept. 22, 1976 (Patent Publication No. 23 65 843) "Improvements in systems for digital transmission and display of texts on a television screen";

French Patent Application No. 78 07551, filed on Mar. 10, 1978 (Patent Publication No. 24 19 623) and entitled "System for digital transmission and display of texts and graphics on a television screen".

Videotext systems are essentially limited to the transmission and display of characters and semi-graphics.

The telewriting terminal which has been described hereinabove may, with a few additions, also perform the functions of a videotext terminal. In this variant embodiment, the invention offers a user provided with a single terminal the two types of communications, viz. videotext and telewriting, while, before, the user had to have two types of terminals. Moreover, the invention allows a third type of communication by the combination of the two systems which complete each other: the videotext offers possibilities of total graphics (and not simply semi-graphics) and telewriting extends towards the transmission of characters and graphics of the videotext type.

Figure 7:
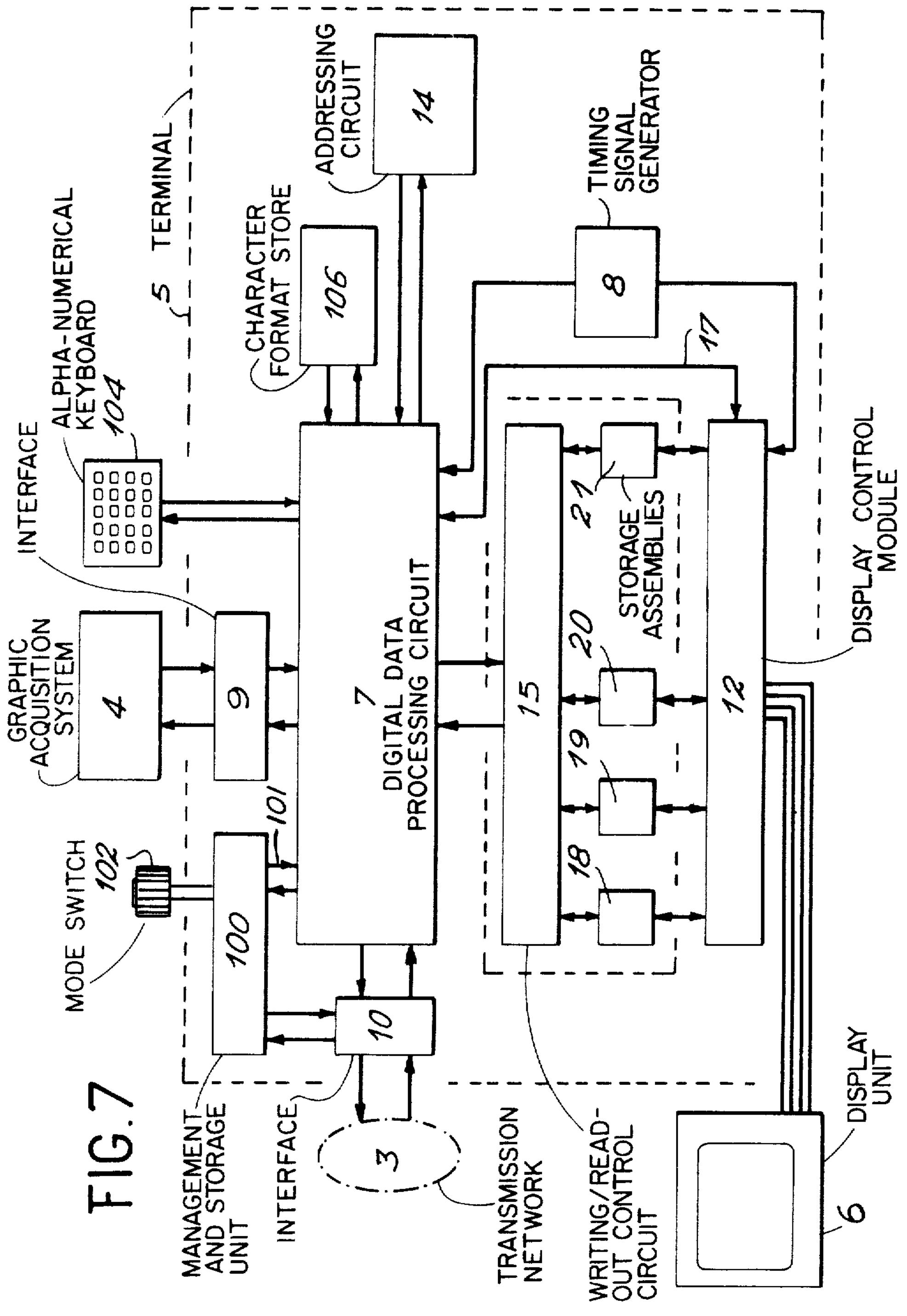
FIG. 7 shows a variant embodiment of the terminal of the invention adapted to function for videotext (view data).

This variant embodiment is described in FIG. 7.

The terminal shown schematically in this Figure comprises means already shown in FIG. 3 and which, for simplification, bear the same references. It further comprises:

a unit 100 for managing and storing the mode of functioning; this unit controls the interface 10 and is connected to the data processing circuit 7 via a link 101 whose electrical state defines this mode;

a mode switch 102 connected to said unit 100, having three positions: "telewriting", "videotext" and "telewriting-videotext";

an alphanumerical keyboard 104 with keys connected to the data processing circuit 7;

a character format store 106, also connected to the data processing circuit 7.

These means are adapted to define three modes of functioning for the terminal:

(a) a telewriting mode in which the keyboard 104 and the character format store 106 are rendered inoperative and in which the data processing circuit 7 and the storage unit 11 function as in telewriting;

(b) A videotext mode in which the keyboard 104 and the character format store 106 are brought into operation and cooperate with the data processing system 7, the interface 10 and the storage unit 11 as in conventional videotext;

(c) a combined telewriting-videotext mode in which the terminal passes alternately in the telewriting mode and in the videotext mode, under the control of the management and storage unit 100.

The functioning of the terminal in telewriting mode alone has been broadly described hereinabove and will not be described again.

In videotext mode, the information coming from the transmission network 3 is coded according to the videotext standards defined in the above-mentioned references. The alphanumerical keyboard 104 selects the information transmitted by the network. To this end, the characters typed on this keyboard reach the circuit 7 in ASCII code on 7 bits of an octet (the eighth is a parity bit). The circuit 7 transmits these characters directly to the transmission interface 10 which sends them to the network 3. The latter contains the modulation and demodulation units, the units for selecting the pages and for adapting the transmission speed of the information.

In the case of videotext in broadcast version, all the adaptations concerning the reception of the information according to the DIDON and ANTIOPE systems are defined in the documents cited above. In the case of videotext in interactive version, only a modulator-demodulator is necessary.

When the channel selector 102 is in the position corresponding to the combined mode, the transmission interface 10 passes alternately in the "telewriting" mode and in the "videotext" mode as a function of the information that the circuit 100 managing and storing the mode of functioning furnishes thereto. To this end, this circuit filters the data transiting through the transmission interface in order to manage a state automaton which may take two different states:

a state 1 where the codes transmitted represent videotext information;

a state 2 wherein the codes transmitted represent telewriting information.

When switched on, the automaton is in one of these states, for example is always in state 1. It remains in this state as long as it does not find, in the transmitted codes, the series of the three octets 9B/25/61". When these three octets are present, it passes into state 2 corresponding to telewriting ("telewriting code output" code); this code is an octet coded "OF" sent in the "octet synchronisation" state of the telewriting transmission.

The mode management and storage circuit 100 therefore controls the interface 10, indicating to it in which mode it is to operate. Moreover, the circuit 100 converses with the data processing circuit 7 to indicate the type of data which are transmitted. To this end, a link 101 indicates, by its electrical state, the type of the data transiting between 10 and 7. This link 101 controls the circuit 7 and specifies the mode to be used at reception.

The control of the mode of functioning of the circuit 7 at emission is obtained by discrimination in the peripheral equipment furnishing the data knowing that the board corresponds to telewriting and the alphanumeric keyboard to videotext.

In the reception mode, the unit 100, by decoding the information received by the interface 10, controls the mode of functioning. Moreover, the unit 100 eliminates the mode change codes included in the information transiting between the interface 10 and the circuit 7.

In the emission mode, upon each detection of change of mode of functioning of the circuit 7, the unit 100 causes the interface 10 to emit the codes necessary for changing mode.

The system is provided with a display attribute store: for color of the character, color of the background, size of the character, continuous or separate graphic, normal, reversed . . . background. This store is addressed by decoding the controls of the display attributes. It furnishes the circuit 7 with information for filling the display store.

The circuit 7 also has a store for moving the slider in coordinates (X, Y). This store is up-dated as a function of the writing in storage, character display or slide movement controls.

Thus, when a character to be displayed is received, the circuit 7 will take from the character format store 106 the octets to be written in the various assemblies of the store. These octets are possibly modified as a function of the display attributes.

The circuit 7 furnishes to the store writing device 15:

the writing address of the octet: to this end, it takes the coordinates (X, Y) of the slide and causes them to be converted by the address computing system 14;

the octet to be written;

the storage assemblies to be validated or not as a function of the background color and character color;

the special code for controlling the writing of videotext characters. This mode corresponds to writing with scratching of what existed beforehand.

The circuit 7 launches this procedure again as often as is necessary to write a character. Thus, when a character is coded on 20 lines with 16 points per line, forty writings of octets must be made in the display storage assemblies.

The device which has just been described allows the transmission of information intended to cause a colored surface of any format to appear on a screen.

Certain known devices are equipped with means for reproducing geometrical figures defined by a closed curve, such as a square, rectangle, rhomb, trapezoid, triangle, circle, oval, . . . . The common characteristic of these surfaces is that they may easily be placed in equation. Limitation to these simple surfaces is naturally undesirable. For greater details, reference will be made to technical note No. 697 of the Centre of Research on Communications of the Canadian Ministry of Communications, entitled: "General description of the TELIDON, Canadian proposal concerning the Videotext systems" by H. G. Bown, C. D. O'Brien, W. Sawchuh and J. R. Storey, of December 1978 (Ottowa).

The present invention enables these drawbacks to be overcome and therefore increases the information capacity offered to users, improves the quality of the image and limits fatigue of the user.

To this end, one of the storage assemblies of the terminal is used for a temporary storage of the information relative to this application. In addition, the acquisition device, such as for example the writing board, has additional facilities so that the user indicates his wish to fill the inside, the outside, or both, of a surface which has been defined. Moreover, the additional storage assembly is organized so as to be able easily to fill the storage assemblies containing the data constituting the displayed synthetic image.

The surface to be colored may be described by the curve constituting its boundary. The data representing this curve are transmitted by the network or the transmission channel; coding may be of the telewriting type, equation of the curve, series of the coordinates of the points constituting the curve. The data relative to the boundary of the surface, after shaping by the processing circuit, are arranged in the storage assembly allocated to this task and according to a particular procedure.

The data processing unit seeks this information once the transmission is finished in order to store the necessary data in the assemblies constituting the memory of the image to be displayed. As soon as this phase is terminated, the filling storage assembly becomes available again for any other use.

In the following specification is it assumed by way of explanation that the data transmitted between the terminals in communication are of the telewriting type, this in no way affecting the generality of the invention, but facilitating the specification thereof.

A user of the system wishes to transmit a surface of which the inside (for example) is in a chosen color. To this end, the writing board is used to indicate the color and the "filling" function with the aid of any means such as a key, knob, switch . . . . Solely the boundary of the surface is plotted on this board. This boundary is a continuous, closed curve. Its terminal transmits it in the form of a digital code established by the processing circuit 7; transmission is effected by the network or channel 3. For example, the transmission code may be that of telewriting.

At reception, the terminal receives the data coming from the network 3, on the interface 10. The processing device 7 receives the data. In the heading of the data, a positioned binary element indicates that the following curve corresponds to a colored surface. Taking this information into account, the circuit 7 no longer writes the points of the curve in the display stores, for example the assemblies 18, 19, and 20, but in a special storage assembly, for example assembly 21. This storage assembly is organized in the same way as the others, i.e. the same binary element corresponds to the same point to be displayed on the display device 6. This is not compulsory, but widely facilitates the work of the circuit 7.

In a first phase, the circuit 7 decodes the data coming from the line and places at 1 the binary elements of the assembly 21 corresponding to the points of the boundary. There are several exceptions to this rule. Firstly, if the corresponding point has been written previously (for example the case of a double point), this point must be returned to O. A direction, the vertical or the horizontal, must then be preferred. The horizontal may be chosen, the reasoning remaining valid if it is the vertical which is chosen. In the case of the boundary having a horizontal part (case of a curve having a maximum, a minimum or a point of inflection,) only the first point of the horizontal is placed at 1, the other points being unchanged. On the contrary, the last point of the horizontal must be placed at 1 in the case of an extreme (maximum or minimum), but must remain unchanged (at zero) in the case of a point of inflection. To this end, the circuit 7 must store the last point before the horizontal and must compare with the point following the horizontal to know whether or not there has been a change of side of the curve with respect to the horizontal.

All the points of the boundary being written in this way in the assembly 21, the circuit 7 passes to the phase of construction and display of the surface. To this end, the assembly 21 is scanned along the horizontals to be displayed. Along each horizontal, a binary element 1 signifies that, from this point, the boundary is crossed. Thus, if one began at the beginning of a horizontal from the outside, the first binary element 1 corresponds to the passage to the inside and the second to the outside. A third binary element 1 causes passage to the inside, a fourth to the outside, etc. Thus, the circuit 7 may reconstitute the surface and fill the display stores 18, 19 and 20 with the necessary elements, according to the procedure which has already been described.

Once all the horizontals have been scanned in this way by the circuit 7, the colored surface is displayed and the assembly 21 may be returned to zero for subsequent use.

If the codes received from the transmission line or channel 3 are not of the telewriting type, new functions must be added to the data processing circuit 7. This circuit 7 must then interpret the codes received in order to reconstitute the series of the coordinates (X, Y) of the points constituting the boundary of the surface.

It may be that the succession of data received from the network 3 does not correspond to a closed curve. The processing circuit 7 detects this anomaly since the first and the last points of the curve do not coincide. This case may occur with telewriting codes. The processing circuit 7 then automatically closes the curve by joining the last point received to the first point received by a segment of a straight line. Thus, the information contained in the assembly 21 will always be relative to a closed curve, and therefore to the boundary of a surface.

TABLE

| | Codes of functions | | | | | Logic functions | Operations |
|---|---|---|---|---|---|---|---|
| 1st cycle time | 0 | 0 | 0 | 0 | 0 | $\overline{O}_i \cdot M_i \rightarrow M_i$ | non-used |
| | 0 | 0 | 0 | 0 | 1 | $\overline{O}_i \cdot M_i \rightarrow M_i$ | a |
| | 0 | 0 | 0 | 1 | 0 | | free |
| | 0 | 0 | 0 | 1 | 1 | | free |
| | 0 | 0 | 1 | 0 | 0 | $M_i \rightarrow M_i$ | non-used |
| | 0 | 0 | 1 | 0 | 1 | $\overline{O}_i \cdot M_i \rightarrow M_i$ | b |
| | 0 | 0 | 1 | 1 | 0 | | free |
| | 0 | 0 | 1 | 1 | 1 | | free |
| | 0 | 1 | 0 | 0 | 0 | $M_i \rightarrow M_i$ | non-used |
| | 0 | 1 | 0 | 0 | 1 | $M_i \rightarrow M_i$ | C |
| | 0 | 1 | 0 | 1 | 0 | | free |
| | 0 | 1 | 0 | 1 | 1 | | free |
| | 0 | 1 | 1 | 0 | 0 | $M_i \rightarrow M_i$ | d |
| | 0 | 1 | 1 | 0 | 1 | $M_i \rightarrow M_i$ | d |
| | 0 | 1 | 1 | 1 | 0 | $M_i \rightarrow M_i$ | d |
| | 0 | 1 | 1 | 1 | 1 | $M_i \rightarrow M_i$ | d |
| 2nd cycle time | 1 | 0 | 0 | 0 | 0 | $M_i \rightarrow M_i$ | non-used |
| | 1 | 0 | 0 | 0 | 1 | $O_i + M_i \rightarrow M_i$ | a |
| | 1 | 0 | 0 | 1 | 0 | | free |
| | 1 | 0 | 0 | 1 | 1 | | free |
| | 1 | 0 | 1 | 0 | 0 | $M_i \oplus O_i \rightarrow M_i$ | non-used |
| | 1 | 0 | 1 | 0 | 1 | $M_i \oplus O_i \rightarrow M_i$ | b |
| | 1 | 0 | 1 | 1 | 0 | | free |
| | 1 | 0 | 1 | 1 | 1 | | free |
| | 1 | 1 | 0 | 0 | 0 | $O_i \oplus M_i \rightarrow M_i$ | non-used |
| | 1 | 1 | 0 | 0 | 1 | $O_i \oplus M_i \rightarrow M_i$ | c |
| | 1 | 1 | 0 | 1 | 0 | | free |
| | 1 | 1 | 0 | 1 | 1 | | free |
| | 1 | 1 | 1 | 0 | 0 | zero$\rightarrow M_i$ | d |
| | 1 | 1 | 1 | 0 | 1 | $O_i \rightarrow M_i$ | d |
| | 1 | 1 | 1 | 1 | 0 | $\overline{O}_i \rightarrow M_i$ | d |
| | 1 | 1 | 1 | 1 | 1 | One$\rightarrow M_i$ | d |

What is claimed is:

1. In a device for a digital transmission and display of graphics on a screen, comprising at least two telewriting terminals connected by a transmission network, each terminal being associated with a graphic acquisition device and with a unit for display on a screen, each terminal being organized around a digital data processing circuit connected to said graphic acquisition device via a first interface and to the network via a second interface, the circuit receiving from one or the other interface digital data comprising in particular coordinates X and Y of points composing graphics and display codes or information enabling a display of said graphics, each terminal further comprising a unit for storing these digital data, inserted between the data processing circuit and a display control module, said module controlling the display of said points by said unit for display. each terminal comprises:

(a) a plurality of storage assemblies, each storage assembly being constituted by a random access memory (RAM) of sufficient capacity to be able to contain informations corresponding to a complete image covering said screen, said memory having a writing input, a read-out output, a validation input and an addressing input, each storage assembly comprising a logic function generator having a control input, a first signal input, a second signal input connected to the read-out output of the random access memory and a signal output connected to the writing input of said memory signal output conveying a word to be written which is a logic function of a word applied to the first signal input and a word applied to the second input;

(b) an address computing circuit receiving, via the data processing circuit, for each current point written on the graphic acquisition device, said coordinates X and Y of said point and delivering on octet $P_i$ comprising only one binary element equal to "1", said octet being applied to the first input of the logic function generator, and a digital signal constituting an address for said octet $P_i$;

(c) a circuit for controlling writing and read-out in the storage assemblies, comprising:

($c_1$) a selector circuit having an input connected to the output of the data processing circuit from which it receives four signals: a first signal which is said octet $P_i$, a second signal which is a validation code formed by as many binary elements as there are storage assemblies, a third signal which is a logic function code, and a fourth signal which is an address of said octet $P_i$, the selector having first, second, third and fourth outputs and being adapted to direct the four signals that it receives respectively on said four outputs, ($c_2$) a first store having an input connected to the first output of said selector circuit from which it receives the octet $P_i$ and an output connected to the signal input of the logic function generator, ($c_3$) a second store having an input connected to the second output of said selector circuit, from which it receives binary elements forming a validation code, said second store containing as many storage binary cells as there are storage assemblies, said cells each being connected to an output connection, said output being connected to said validation input of one of said random access memories, said memories therefore all being able to be validated in parallel;

($c_4$) a third store having an input connected to the fourth output of said selector circuit, from which it receives the address of the octet $P_i$ and having an output connected to the addressing inputs of the storage assemblies, said storage assemblies, computing circuit and controlling circuit allowing simultaneous access to said plurality of storage assemblies validated in parallel to write therein binary information at a desired address taking into account the information already written at this address according to predetermined functions.

2. The device of claim 1, wherein the display unit is a television receiver with 512 lines of 768 displayable points and each random access memory has a capacity of 48K octets (K=1024), the address of octet $P_i$ in the random access memory being a word of 16 binary elements (2 octets).

3. The device of claim 1, wherein the display unit and the acquisition device have standards which are different, the address computing circuit comprises a programmable read-only memory which receives coordinates X and Y of points written in said acquisition device and which delivers converted coordinates X' and Y' corresponding to the standard of the display unit, computing of the address of octet $P_i$ being effected from said coordinates X' and Y'.

4. The device of claim 1, wherein it further comprises, in the writing and read-out assembly, a code conversion programmable read-only memory having an input connected to the third output of the selector circuit from which it receives a code of logic functions, and having an output delivering a code adapted to the logic function generator.

5. The device of any one of claims 1 to 4, wherein three of the storage assemblies are allocated to storing the data corresponding to graphics respectively in the three primary colors red, green, blue.

6. The device of claim 5, wherein a fourth storage assembly is allocated to storing the graphics even after complete erasing of the screen.

7. The device for digital transmission and display of graphics and/or characters of claim 1, wherein each terminal further comprises:

a unit for managing and storing a mode of functioning, said unit controlling the second interface and being connected to the data processing circuit by a link whose electrical state depends on this mode, a mode switch with three positions connected to said unit, an alphanumeric keyboard with keys connected to the data processing circuit, a character format store connected to the data processing circuit, said managing unit, said mode switch, said alphanumerical keyboard and said character format store being adapted to define three modes of functioning for the terminal:

(a) a telewriting mode in which the keyboard and the character format store are rendered inoperative and in which the data processing circuit and the storage unit function as in telewriting;

(b) a videotext mode in which the keyboard and the character format store are put into service and cooperate with the data processing system, the second interface and the storage unit as in conventional videotext, (c) a combined telewriting-videotext mode in which the terminal passes alternately in the telewriting mode and in the videotext mode under the control of the managing and storage unit which filters the data transiting via the interface and controls, from the state of functioning of these data, the state of functioning of the terminal.

8. The device of claim 5, wherein an additional storage assembly is allocated to storing the information relative to a definition of a closed curve defining a surface, an inside area and an outside area, the data processing system being adapted to process this information to control the display of the inside and/or the outside areas of this curve according to a determined color.

9. The device of claim 1, comprising in the logic function generator, a code conversion programmable read-only memory having an input connected to the third output of the selector circuit from which it receives a code of logic functions, and having an output delivering a code adapted to the logic function generator.

* * * * *